United States Patent [19]

Jung et al.

[11] Patent Number: 5,838,115
[45] Date of Patent: Nov. 17, 1998

[54] GAS DISCHARGE DEVICE

[75] Inventors: Markus Jung, Bruchsal; Eberhard Zeyfang, Reichenbach; Guenther Renz, Ostfildern, all of Germany

[73] Assignee: Deutsche Forschungsanstalt fuer Luft- und Raumfahrt e.V., Bonn, Germany

[21] Appl. No.: 826,396

[22] Filed: Mar. 25, 1997

[30] Foreign Application Priority Data

Mar. 25, 1996 [DE] Germany ............... 196 11 679.1

[51] Int. Cl.⁶ .................................. H05B 37/00
[52] U.S. Cl. .................... 315/237; 315/241 R; 315/240; 315/171
[58] Field of Search ................. 315/227 R, 237, 315/111.21, 241 R, 240, 326, 171, 173, 172; 372/74, 86, 87, 55

[56] References Cited

U.S. PATENT DOCUMENTS

| | | | |
|---|---|---|---|
| 4,230,994 | 10/1980 | Bradley | 315/241 R X |
| 4,385,261 | 5/1983 | Kogelschatz et al. | 315/170 |
| 4,450,566 | 5/1984 | Marchetti et al. | 372/38 |
| 4,596,017 | 6/1986 | Fenstermacher et al. | 372/74 |

OTHER PUBLICATIONS

P.J. M. Peters, et al., "Gas–Discharge XeF* (B→X) Laser with High Specific Output Energy," *Applied Physics*, B59, (1994), pp. 533–535.

A. N. Balandin, et al., "Excimer Laser for Microtechnology," *Instruments and Experimental Techniques*, vol. 37, No. 5, Part 2, 1994, pp. 606–611.

M. M. Turner, "Modeling the Self–Sustained Discharge–Excited XeCl Laser," *J. Appl. Phys.*, vol. 71, No. 5, Mar. 1, 1992, pp. 2113–2122.

W. Chong–Yi, et al., "A Self–Sustained Discharge Multiatmospheric $CO_2$ Laser with Electron–Beam Preionization," *Optics Communications*, vol. 46, No. 5.6, Jul. 15, 1983, pp. 311–314.

Y. Bychkov, et al., "Efficient High–Homogeneous Wide––Aperture Excimer Discharge Using a Stabilizing Low–Current Predischarge," *Rev. Sci. Instrum.*, vol. 65, No. 4, Apr. 1994, pp. 793–798.

*Primary Examiner*—Benny T. Lee
*Assistant Examiner*—Haissa Philogene
*Attorney, Agent, or Firm*—Barry R. Lipsitz

[57] ABSTRACT

In a gas discharge device having a gas discharge channel, which comprises two gas discharge electrodes and a gas discharge volume lying between said electrodes, having an energy storage circuit connected by a switching device to the gas discharge electrodes for producing a current surge flowing between a first output terminal and a second output terminal for operating a gas discharge, and having an ignition device for separate ignition of the gas discharge, in order to improve said device in such a way that it operates better and more reliably, it is proposed that the switching device comprises a voltage divider lying between the output terminals and comprising a first and a second impedance, that the gas discharge electrodes are connected in parallel to the first impedance and a spark gap is connected in parallel to the second impedance, that the first impedance is so dimensioned that, in the absence of a gas discharge, a voltage lying below the breakdown voltage of the gas discharge electrodes is applied to the latter, and that the spark gap is so designed that its breakdown voltage is exceeded after separate ignition of the gas discharge and so the current surge flows from the energy storage circuit through the spark gap to the gas discharge electrodes.

8 Claims, 4 Drawing Sheets

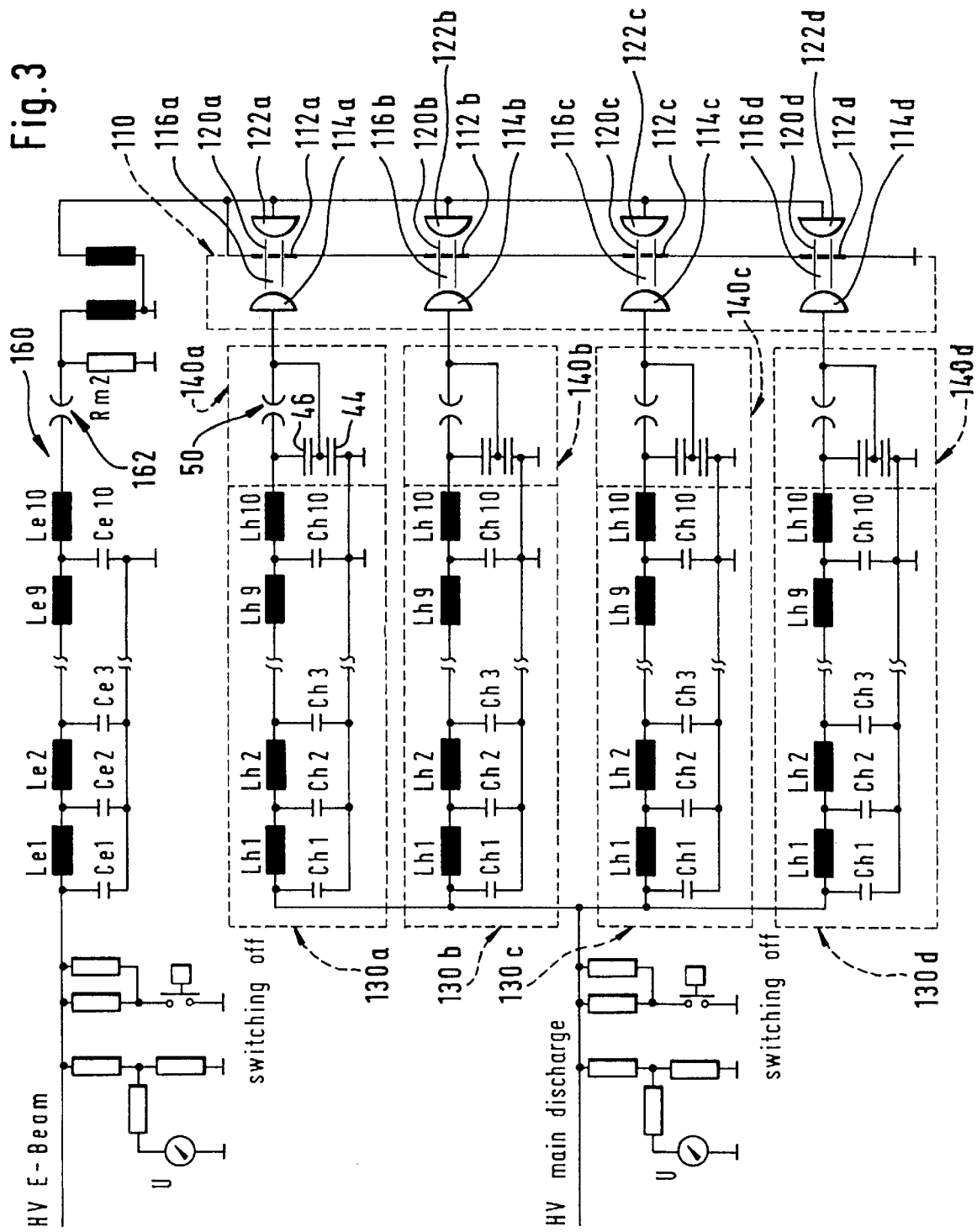

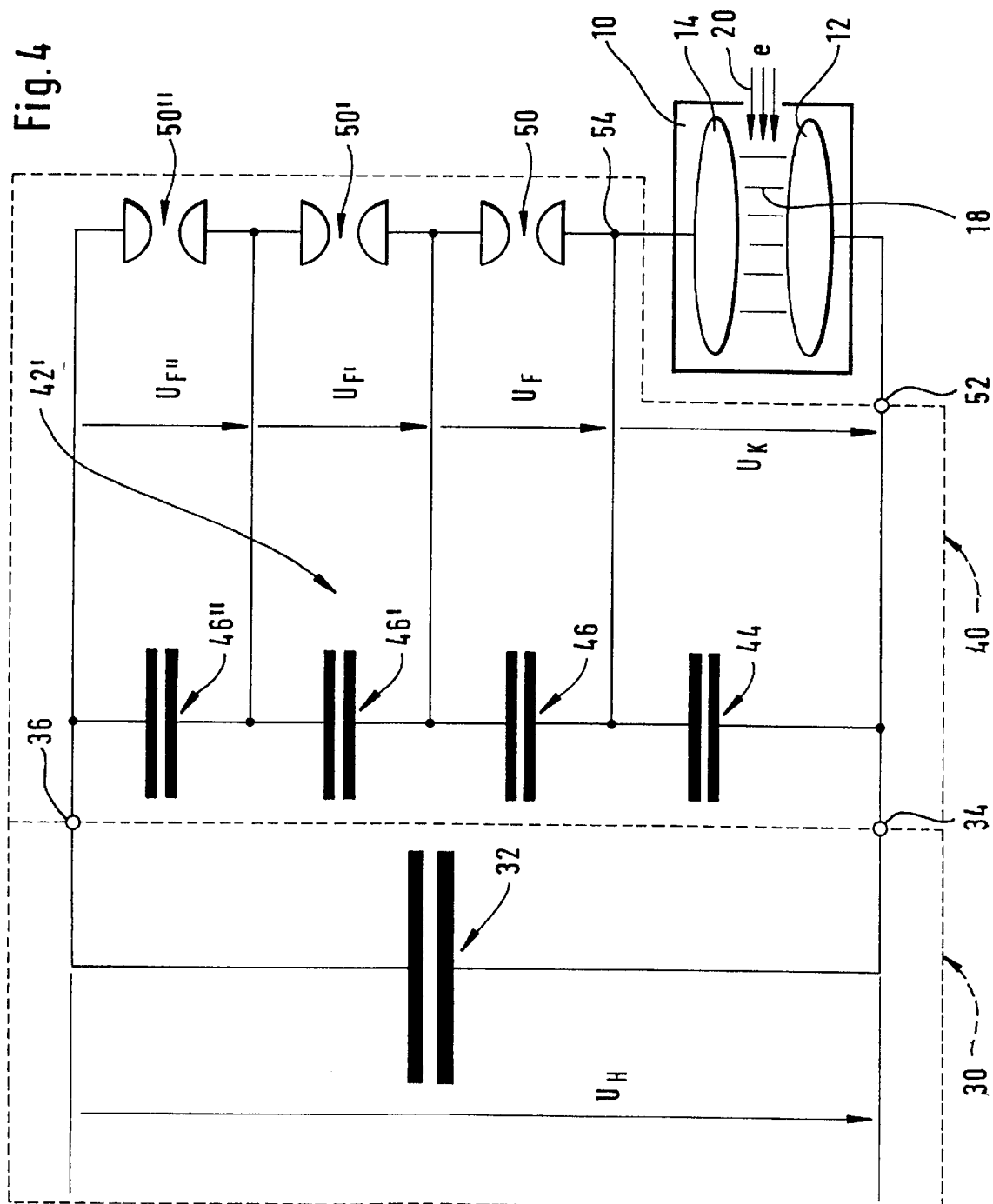

GAS DISCHARGE DEVICE

BACKGROUND OF THE INVENTION

The invention relates to a gas discharge device having a gas discharge channel, which comprises two gas discharge electrodes and a gas discharge volume lying between said electrodes, having an energy storage circuit connected by a switching device to the gas discharge electrodes for producing a current surge flowing between a first output terminal and a second output terminal for operating a gas discharge in the gas discharge volume, and having an ignition device for separate ignition of the gas discharge.

Such gas discharge devices are known from prior art. They are preferably so-called electron-beam-controlled gas discharge devices, in which case the problem exists of igniting the gas discharge in synchronism with the externally produced electron beam. Particularly when the gas discharge is to occur at voltages lying above the breakdown voltage of the gas discharge volume between the gas discharge electrodes, injection of the energy stored in the energy storage circuit into the gas discharge in synchronism with the separate ignition has up till now been possible only with an externally triggerable switching device.

For triggering it was therefore necessary to use in the switching device thyristors, thyratrons or other switching elements which, on the one hand, are very expensive and, on the other hand, are the limiting variable in the useful life of the gas discharge device.

There is moreover the danger that malfunctions during production of the electron beam will lead to the switching device connecting the energy storage circuit to the gas discharge electrodes even though there is an insufficiently pre-ionized gas in the gas discharge volume, resulting in an uncontrolled self-maintained discharge which, as a rule, leads to an undesired arc discharge in the gas discharge volume. Such an undesired arc discharge, on the other hand, again gives rise to voltage reversals and finally results in the triggerable switching elements in particular being subjected to a level of stress many times higher than under normal operating conditions and therefore breaking down prematurely.

The object of the invention is therefore to improve a gas discharge device of the generic type in such a way that it operates better and more reliably.

SUMMARY OF THE INVENTION

In a gas discharge device of the type described initially, said object is achieved according to the invention in that the switching device comprises a voltage divider lying between the output terminals and comprising a first and a second impedance, that the gas discharge electrodes are connected in parallel to the first impedance and a spark gap is connected in parallel to the second impedance, that the first impedance is so dimensioned that, in the absence of a gas discharge, a voltage lying below the breakdown voltage of the first gas discharge electrodes is applied to the latter and that the spark gap is so designed that its breakdown voltage is exceeded after separate ignition of the gas discharge and so the current surge flows from the energy storage circuit through the spark gap to the gas discharge electrodes.

The perceived advantage of the solution according to the invention is that the switching device is of an extremely simple design and that the switching device no longer requires external triggering but automatically, once the gas discharge has been separately ignited, likewise switches through and allows the current surge to flow from the energy storage circuit to the gas discharge electrodes.

Thus, all of the problems associated with as precise as possible a triggering of the switching device in synchronism with the separate ignition, in particular with the electron beam, are eliminated and, in addition, the switching device no longer has any expensive and sensitive components.

In principle it is sufficient in the voltage divider to operate with two impedances, namely one to which the gas discharge electrodes are connected in parallel and one to which the spark gap is connected in parallel. More advantageous conditions, particularly as regards the design of the spark gaps and as regards the resultant switching security thereof may however be achieved when the voltage divider comprises a cascade of impedances and spark gaps each connected in parallel to said impedances. This has the advantage that, on the whole, there are lower voltages applied to the spark gaps themselves and so the dimensioning of the sparking voltage may be effected more easily in view of their breakdown security and their breakdown voltage.

To achieve as high a breakdown security as possible, it is particularly advantageous when the spark gaps are so dimensioned that exceeding of their breakdown voltage after separate ignition of the gas discharge is effected at successive instants, i.e. one of the spark gaps breaks down first and then the others in succession.

In the switching device according to the invention, the voltage divider could in principle comprise any type of impedance. However it is particularly advantageous, especially for avoiding losses, when the impedances are capacitors.

Thus, even when a high voltage is applied, no currents flow through said capacitors and the first impedance in the form of a capacitor is moreover used, after separate ignition of the gas discharge in the gas discharge area, initially to maintain the gas discharge with the energy stored there, namely until the spark gap has ignited and the gas discharge is fed by the current surge of the energy storage circuit flowing through said spark gap.

It is also particularly advantageous when the first impedance is connected on the one hand to earth and so one of the gas electrodes connected in parallel thereto is also connected to earth.

The solution according to the invention is suitable preferably for electron-beam-controlled sheet gas discharges.

The solution according to the invention may be used to particular advantage when the gas discharge channel is a gas discharge channel of a gas laser.

Thus far, no detailed information about the energy storage circuit has been provided in connection with the description of the individual embodiments. A particularly advantageous embodiment therefore provides that the energy storage circuit comprises a capacitor bank having a plurality of capacitors connected in parallel by inductors.

Further features and advantages of the invention are the subject matter of the following description as well as of the graphic representation of several embodiments.

BRIEF DESCRIPTION OF THE DRAWINGS

FIG. 2 a representation of the voltages and currents arising in the gas discharge switching device according to the invention, wherein

FIG. 3 a diagrammatic view of a second embodiment of the solution according to the invention having a plurality of gas discharge electrodes and FIG. 4 a diagrammatic view of a third embodiment of the solution according to the invention.

DETAILED DESCRIPTION OF THE INVENTION

Figure 1:
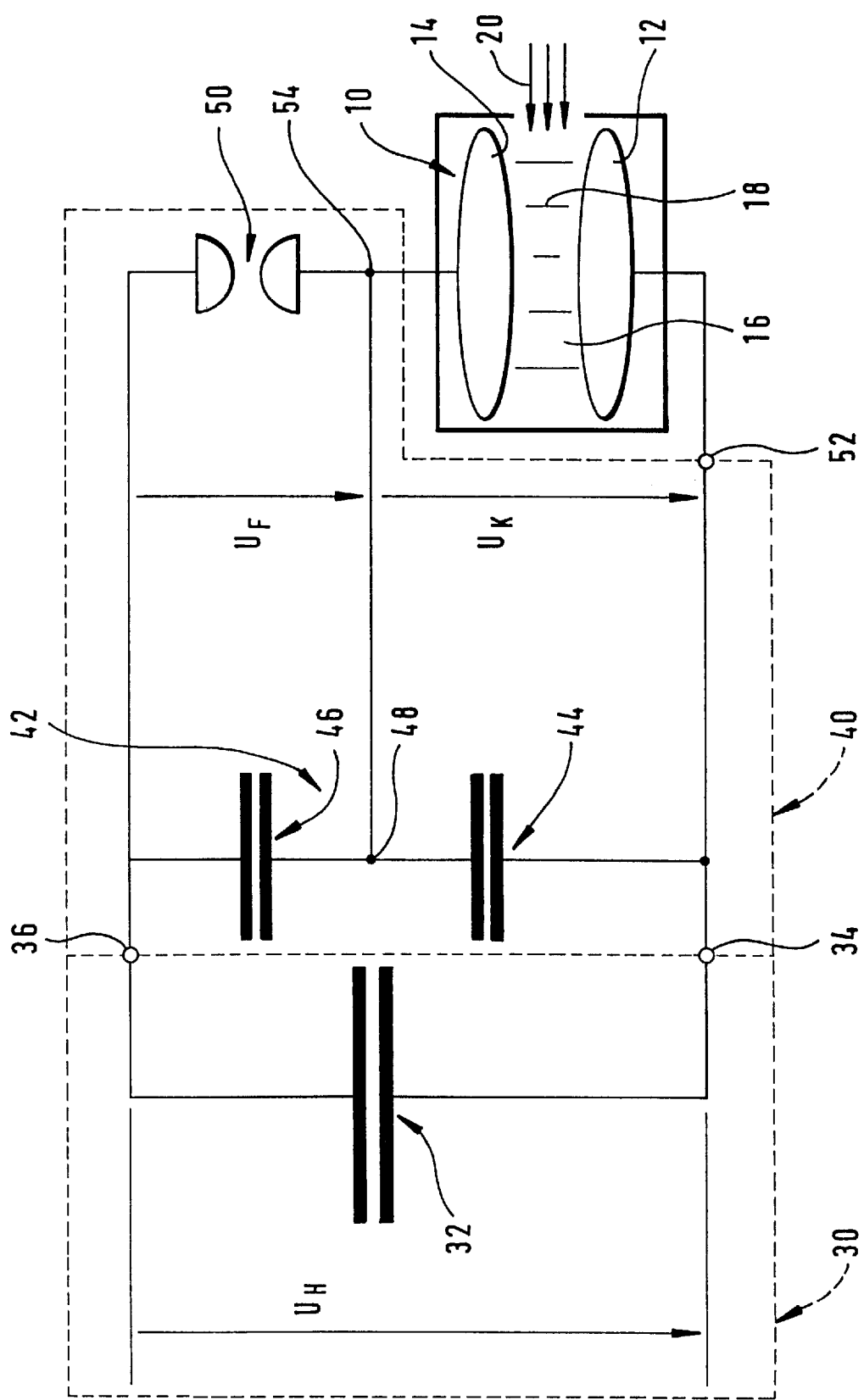
FIG. 1 a diagrammatic view of a first embodiment of a gas discharge device according to the invention.

According to FIG. 1, a first simplified embodiment of a gas discharge device according to the invention, which for example is part of an electron-beam-controlled repetitively pulsed $CO_2$ laser of the type described in the article "Experimental results of an E-Beam Controlled Repetitively Pulsed $CO_2$ Laser" in the periodical SPIEVOL. 12/76 $Co_2$ lasers and applications II (1990) pages 77 to 85, comprises a gas discharge channel denoted as a whole by 10, in which two gas discharge electrodes 12 and 14 are disposed. Lying between said gas discharge electrodes 12 and 14 is a gas discharge volume 16 which, in the case of the present gas discharge device, is $CO_2$.

Control of a sheet gas discharge, indicated by dashes 18, between the electrodes 12 and 14 is effected by means of an electron beam 20 which passes into the gas discharge volume 16 in order to ignite sheet gas discharge 18 in a defined manner.

In order to maintain the sheet gas discharge 18 after its ignition by the electron beam 20, an energy storage circuit denoted as a whole by 30 is provided which comprises a plurality of capacitors, which are connected in parallel and are represented in FIG. 1 by the capacitor 32.

A high voltage $U_H$ in the region of several kV is applied to the capacitor 32.

The energy storage circuit 30 comprises a first, earthed output terminal 34 and a second output terminal 36, both of which are connected in each case to one terminal of the capacitor 32. Connected to the two output terminals 34 and 36 is a switching device denoted as a whole by 40, which is used to connect the energy storage circuit 30 to the electrodes 12 and 14 of the gas discharge channel 10 at the appropriate moment, namely immediately after ignition of the sheet gas discharge 18 by means of the electron beam 20.

The switching device 40 comprises a voltage divider 42 lying between the output terminals 34 and 36 and comprising a first capacitor 44 and a second capacitor 46, the first capacitor 44 lying between the first output terminal 34 and a centre tap 48 of the voltage divider 42, while the second capacitor 46 lies between the centre tap 48 and the second output terminal 36.

The switching device 40 in turn comprises two terminals 52 and 54, to which the gas discharge electrodes 12 and 14 are connected, the gas discharge electrode 12 being connected to the terminal 52 and the gas discharge electrode 14 being connected to the terminal 54 of the switching device 40.

The terminal 52 of the switching device 40 is on the one hand connected directly to the first output terminal 34 of the energy storage circuit 30, while the terminal 54 is connected by a gas breakdown gap or spark gap 50 to the second output terminal 36 of the energy storage circuit. The terminal 54 is moreover connected directly to the centre tap 48.

Thus, in the switching device 40, the spark gap 50 is connected in parallel to the capacitor 46 and the gas discharge electrodes 12 and 14 connected to the terminals 52 and 54 are connected in parallel to the capacitor 44.

The capacitors 44 and 46 are then so dimensioned that the voltage $U_K$ lying between the first output terminal 34 and the centre tap 48 and applied to the capacitor 44 lies below the breakdown voltage $U_{DK}$ of the gas discharge volume 16 provided that the spark gap 50 has not broken down. Furthermore, the capacitor 46 is so defined that a voltage $U_F$ lying between the centre tap 48 and the second output terminal 36 and hence applied to the capacitor 46 lies below a breakdown voltage $U_{DF}$ of the spark gap 50.

Thus, when the high voltage is fully applied, the dimensioning of the capacitors 44 and 46 of the voltage divider 42 ensures that neither the spark gap 50 breaks down nor is there a breakdown in the gas discharge volume 16 with formation of a gas discharge 18, so that, when the high voltage $U_H$ is fully applied, all of the energy for a current surge for subsequent feeding of the gas discharge 18 may be stored in the capacitor 32.

Figure 2A:
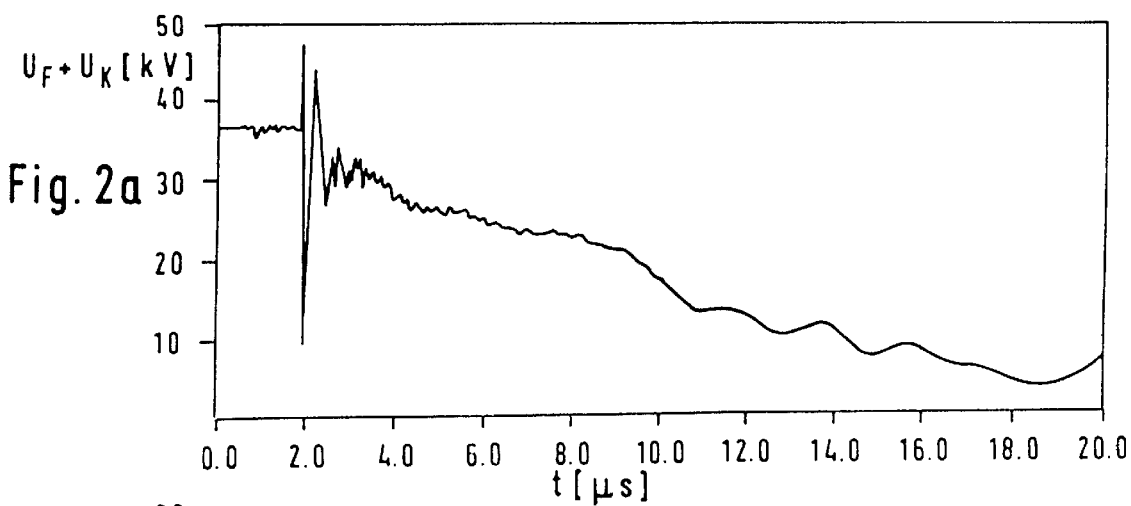
FIG. 2a shows the voltage applied to a spark gap of the switching device according to the invention.
Figure 2B:
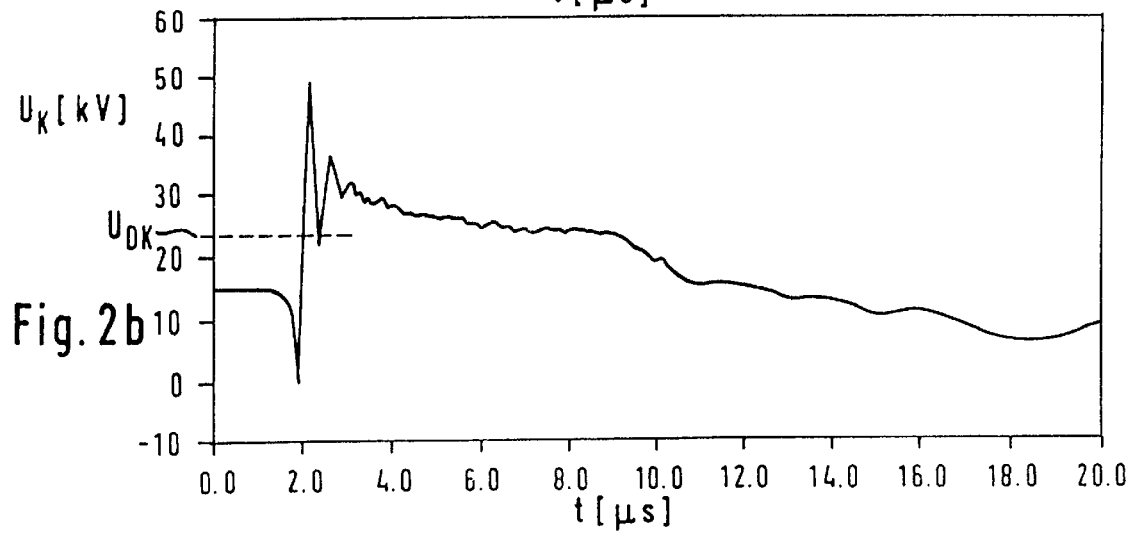
FIG. 2b shows the voltage applied to the gas discharge channel and FIG. 2c shows the current surge flowing through the gas discharge channel, in each case over the same time axis.
Figure 2C:
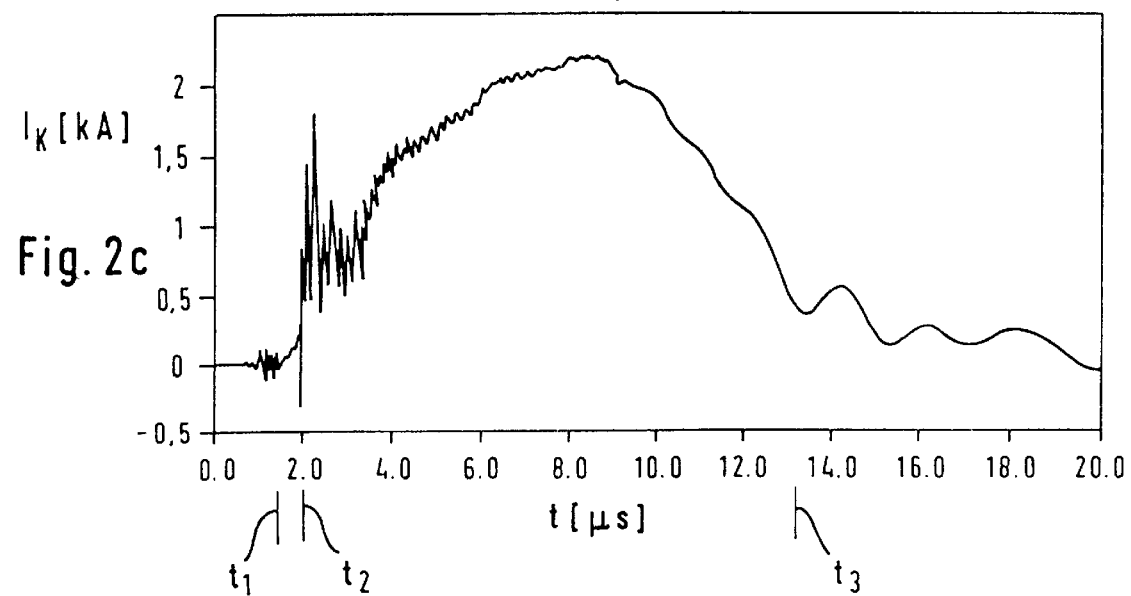

As FIGS. 2a to 2c show, up to a time $t_1$, when the electron beam 20 is switched on and passes into the gas discharge volume 16, the full voltage $U_F$ is applied to the spark gap 50 and the full voltage $U_K$ is applied to the gas discharge electrodes 12 and 14. As a result of the gas in the gas discharge volume 16 being ionized by the incoming electron beam 20, the plasma 18 starts to develop, with the result that between the time $t_1$ and the time $t_2$ the voltage $U_K$ decreases because of the occurrence in the gas discharge volume 16 of the gas discharge 18 assisted by the electron beam 20. Since the sum of $U_K + U_F$ must be $U_H$, said drop in the voltage $U_K$ leads to an increase of the voltage $U_F$ above the breakdown voltage $U_{DF}$ of the spark gap 50 and hence to an ignition thereof. After ignition of the spark gap 50, the voltage $U_F$ decreases and a current surge flows between the output terminals 34 and 36 of the energy storage circuit 30 via the gas discharge channel 10, the current surge flowing from the second output terminal 36 via the broken-down spark gap 50 to the terminal 54, then to the electrode 14, via the gas discharge 18 to the electrode 12 and from the latter via the terminal 52 to the first output terminal 34. By means of said current surge, the energy stored in the entire capacitor 32 discharges in the form of a time-limited gas discharge in the manner shown in FIG. 2c, FIG. 2c showing the characteristic of the current $I_K$, which flows via the gas discharge 18 through the gas discharge channel 10 and which substantially begins at time $t_2$ and ends at time $t_3$.

FIG. 2b shows how, immediately after the breakdown of the spark gap 50, the voltage $U_K$ lying between the electrodes 12 and 14 increases once more before then decreasing again during the current surge.

FIG. 2a further reveals that, after ignition of the spark gap 50, the voltage $U_F$ dropping at said spark gap likewise decreases during the current surge.

In a second embodiment of a solution according to the invention, which is illustrated in FIG. 3, the gas discharge channel 110 comprises a plurality of pairs of gas electrodes 112 and 114 which are represented, for example, by the gas electrode pairs 112a, 114a to 112d, 114e.

Unlike the first embodiment illustrated in a simplified manner, the gas discharge electrode 112 is arranged so as to be permeable for an electron beam 120 required in each case for the corresponding pair of gas discharge electrodes 112 and 114, the respective electron beam 120 being produced by means of an electrode 122 which is associated with the respective gas discharge electrode 112 at the opposite side to the gas discharge electrode 114. Upon application of a voltage between the respective electrode 122 and the corresponding gas discharge electrode 112, the electron beam 120 is produced, which passes through the gas discharge electrode 112 into the gas discharge volume 116.

Associated with each pair of gas discharge electrodes 112, 114 is a switching device 140 according to the invention which, in each case, comprises the spark gap 50 and the capacitors 44 and 46.

Further associated with each pair 112, 114 of gas discharge electrodes is the corresponding energy storage circuit 130.

The individual energy storage circuits 130a to 130d, like the switching devices 140a to 140d associated therewith, operate independently of one another, the respective switching device 140a to 140d upon passing of the respective electron beam 120a to 120d into the respective gas discharge volume 116a to 116d independently switching in order to supply the respective pair of gas discharge electrodes 112a, 114a to 112d, 114d with the corresponding current surge in an identical manner to that described in connection with the first embodiment.

In order to switch on all of the electron beams 120a to 120d at the same time, all of the electrodes 122a to 122d are connected to a supply circuit denoted as a whole by 160, which is connectable by a switch 162 in such a way to the electrodes 122a to 122d that the latter produce the corresponding electron beam 120a to 120d.

In a third embodiment, which is illustrated in FIG. 4, the voltage divider 42' comprises not just a single second impedance 46 but a cascade of second impedances 46, 46' and 46", to each of which a spark gap 50, 50', 50" is connected in parallel. Thus, in the third embodiment, the voltages $U_F$, $U_{F'}$ and $U_{F''}$ applied across each of the spark gaps 50, 50' and 50" are lower so that the spark gaps 50, 50' and 50", given the same high voltage $U_H$, may be designed for lower breakdown voltages $U_{DF}$, $U_{DF'}$ and $U_{DF''}$. As a result, a higher breakdown security of the spark gaps 50, 50' and 50" is achieved. The spark gaps 50, 50' and 50" are preferably so dimensioned that first, after separate ignition of the gas discharge 18 by means of the electron beam 20, the voltage $U_F$ applied to the spark gap 50 rises above the value $U_{DF}$ and so the spark gap 50 breaks down and therefore bypasses the capacitor 46. Then the spark gap 50' breaks down and bypasses the capacitor 46' and finally the spark gap 50" breaks down and bypasses the capacitor 46", so that then, as a whole, via all of the spark gaps 50", 50' and 50 the current surge flows from the energy storage circuit to the gas discharge electrodes 12 and 14 and feeds the gas discharge 18.

The third embodiment is otherwise of an identical construction to the second embodiment so that with regard to the elements provided with the same reference numbers reference is made in full to the explanations made in respect of the first embodiment.

We claim:

1. A gas discharge device having a gas discharge channel, which comprises two gas discharge electrodes and a gas discharge volume lying between said electrodes, having an energy storage circuit connected by a switching device to the gas discharge electrodes for producing a current surge flowing between a first output terminal and a second output terminal for operating a gas discharge, and having an ignition device for separate ignition of the gas discharge, wherein:

the switching device comprises a voltage divider lying between the output terminals and comprising a first and a second impedance, the gas discharge electrodes are connected in parallel to the first impedance and a spark gap is connected in parallel to the second impedance, the first impedance is so dimensioned that, in the absence of a gas discharge, a voltage lying below the breakdown voltage of the gas discharge electrodes is applied to the latter, and the spark gap is so designed that its breakdown voltage is exceeded after separate ignition of the gas discharge so that the current surge flows from the energy storage circuit through the spark gap to the gas discharge electrodes.

2. A gas discharge device according to claim 1, wherein the voltage divider comprises a cascade of second impedances and spark gaps connected in parallel therewith.

3. A gas discharge device according to claim 2, wherein the spark gaps are so dimensioned that exceeding of their breakdown voltage after separate ignition of the gas discharge is effected at successive instants.

4. A gas discharge device according to claim 1, wherein the impedances are capacitors.

5. A gas discharge device according to claim 1, wherein the first impedance is connected to earth.

6. A gas discharge device according to claim 1, wherein the gas discharge is an electron-beam-controlled sheet gas discharge.

7. A gas discharge device according to claim 1, wherein the gas discharge channel is a gas discharge channel of a gas laser.

8. A gas discharge device according to claim 1, wherein the energy storage circuit comprises a capacitor bank having a plurality of capacitors connected in parallel by inductors.

* * * * *